United States Patent
Yamada (10) Patent No.: US 7,302,275 B2
(45) Date of Patent: Nov. 27, 2007

(54) TRANSMIT POWER CONTROL METHOD FOR COMMUNICATION APPARATUS

(75) Inventor: Daisuke Yamada, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 415 days.

(21) Appl. No.: 10/493,886

(22) PCT Filed: Apr. 17, 2003

(86) PCT No.: PCT/JP03/04871

§ 371 (c)(1),
(2), (4) Date: Apr. 29, 2004

(87) PCT Pub. No.: WO03/088526

PCT Pub. Date: Oct. 23, 2003

(65) Prior Publication Data

US 2004/0259583 A1    Dec. 23, 2004

(51) Int. Cl.
*H04B 7/00* (2006.01)
(52) U.S. Cl. .............. 455/522; 455/69; 455/517; 455/450; 455/434; 455/464; 370/337; 370/350; 370/320; 370/335; 370/321; 370/318
(58) Field of Classification Search .......... 455/522, 455/517, 69, 450, 434; 370/337, 350
See application file for complete search history.

(56) References Cited

U.S. PATENT DOCUMENTS

| 5,715,521 | A * | 2/1998 | Fukasawa et al. ........... 455/69 |
| 6,073,022 | A * | 6/2000 | Nakamura et al. .......... 455/450 |
| 6,708,041 | B1 * | 3/2004 | Butovitsch et al. ......... 455/522 |
| 6,850,770 | B2 * | 2/2005 | Hwang ...................... 455/522 |
| 6,865,168 | B1 * | 3/2005 | Sekine ....................... 370/335 |
| 7,095,780 | B2 * | 8/2006 | Nakamura et al. .......... 375/146 |
| 7,110,436 | B2 * | 9/2006 | Yanagi ....................... 375/147 |
| 2002/0086693 | A1 * | 7/2002 | Ahmad et al. .............. 455/522 |
| 2003/0096631 | A1 * | 5/2003 | Kayama et al. ............. 455/522 |
| 2003/0103577 | A1 * | 6/2003 | Harada et al. .............. 375/295 |
| 2004/0076125 | A1 * | 4/2004 | Nakamura et al. .......... 370/318 |
| 2006/0245397 | A1 * | 11/2006 | Zhang ........................ 370/335 |

FOREIGN PATENT DOCUMENTS

| EP | 0975118 | | 1/2000 |
| EP | 975118 | A2 * | 1/2000 |
| JP | 1084586 | | 3/1998 |
| JP | 2000349689 | | 12/2000 |
| JP | 2000353980 | | 12/2000 |
| JP | 2001069073 | | 3/2001 |

OTHER PUBLICATIONS

PCT International Search Report dated Aug. 5, 2003.

* cited by examiner

*Primary Examiner*—Lana Le
*Assistant Examiner*—Amar Daglawi
(74) *Attorney, Agent, or Firm*—Stevens, Davis, Miller & Mosher, LLP (57) ABSTRACT

A communication apparatus (100), when synchronization of a received signal is established, performs transmit power control using a transmit power value obtained by closed-loop transmit power control by a transmit power control circuit (201), and when the synchronization of the received signal is out, controls a current transmit power value to gradually return over a predetermined period to a transmit power value determined at a timing closest to the current timing from among past reliable transmit power values determined when the synchronization was established.

4 Claims, 11 Drawing Sheets

TRANSMIT POWER CONTROL METHOD FOR COMMUNICATION APPARATUS

TECHNICAL FIELD

The present invention relates to a communication apparatus used in a mobile communications system using a CDMA (Code Division Multiple Access) scheme and a transmit power control method for the communication apparatus.

BACKGROUND ART

Conventionally, a mobile communications system using the CDMA scheme, the levels of signals received by a base station from mobile stations vary greatly depending on where the mobile station is located, and thus the far-near problem occurs that a received signal having large power interferes with a received signal having small power. In particular, in a communication system using the CDMA scheme, a plurality of mobile stations share the same frequency band, and hence for each mobile station, signals from other mobile stations become interference signals and degrade the communication quality of its channel. Such interference associated with the far-near problem leads to the reduction of the number of multiple stations in the same cell.

One method for solving this problem is a transmit power control circuit disclosed in Laid-Open Japanese Patent Publication No.2001-69073. In this transmit power control circuit, information data subjected to transmit power control and transmit power control information not subjected to transmit power control are transmitted at the same time from a base station to a mobile station, and the mobile station determines the transmit power of a signal to be sent in return to the base station based on the transmit power control information from the base station.

The transmit power is determined by estimating the receive level of the signal from the base station, and, based on a result of reduction in this receive level, selecting a transmit power for a signal to be sent in return to the base station.

When the receive level decreases at a mobile station, the mobile station selects the transmit power of the signal sent at the previous time in return to the base station under transmit power control as a transmit power for a signal to be sent in return to the base station.

A typical transmit power control apparatus thus controls the transmit power using only the receive level of the received signal at the mobile station, so that it is effective to a certain degree in controlling the transmit power against instantaneous reduction in the level of the received signal due to fading and the like and interference because of. However, changing the transmit power more than needed in response to instantaneous reduction in the level of the received signal and interference causes the transmit power value to vary suddenly and greatly, and consequently the problem occurs that the closed-loop transmit power control is affected in a harmful way.

DISCLOSURE OF INVENTION

The object of the present invention is to provide a communication apparatus and transmit power control method for the communication apparatus that continues communication as long as possible without following rapid changes in the received signal level and which, immediately after detecting that the communication is out, controls transmit power.

According to an embodiment of the present invention, a communication apparatus comprises a first transmit power control section that receives a transmit signal transmitted from a mobile station or base station and controls a transmit power value of a signal to transmit to the mobile station or base station based on the received signal; a transmit power value storage section that stores a predetermined number of past transmit power values from the first transmit power control section; a synchronization determining section that detects a synchronous state of the received signal; and a second transmit power control section that, upon detecting that the synchronous state is not maintained based on a determination result of the synchronization determining section, controls a transmit power value based on a past transmit power value, corresponding to a time the synchronous state was maintained, from among the past transmit power values stored in the transmit power value storage section.

According to another embodiment of the present invention, a transmit power control method for the communication apparatus comprises: a first transmit power control step of receiving a transmit signal transmitted from a mobile station or base station and controlling a transmit power value of a signal to transmit to the mobile station or base station based on the received signal; a transmit power value storing step of storing a predetermined number of past transmit power values from said transmit power control step; a synchronization determining step of detecting a synchronous state of the received signal; and a second transmit power control step of controlling a transmit power value based on a past transmit power value, corresponding to a time the synchronous state was maintained, from among the past transmit power values stored in the storing step, upon detecting that the synchronous state is not maintained based on a result of the detecting step.

BEST MODE FOR CARRYING OUT THE INVENTION

Embodiments of the present invention will be described in detail below with reference to the drawings. Note that the present invention is not at all limited to these embodiments and can be implemented as various embodiments without departing from the spirit and scope of the invention.

The framework concept of the present invention is that, when it is detected that the synchronous state of the received signal is not maintained, the transmit power value is controlled based on a past transmit power value corresponding to a time the synchronous state was maintained, from among past transmit power values stored in a transmit power storage section.

EMBODIMENT 1

Figure 1:
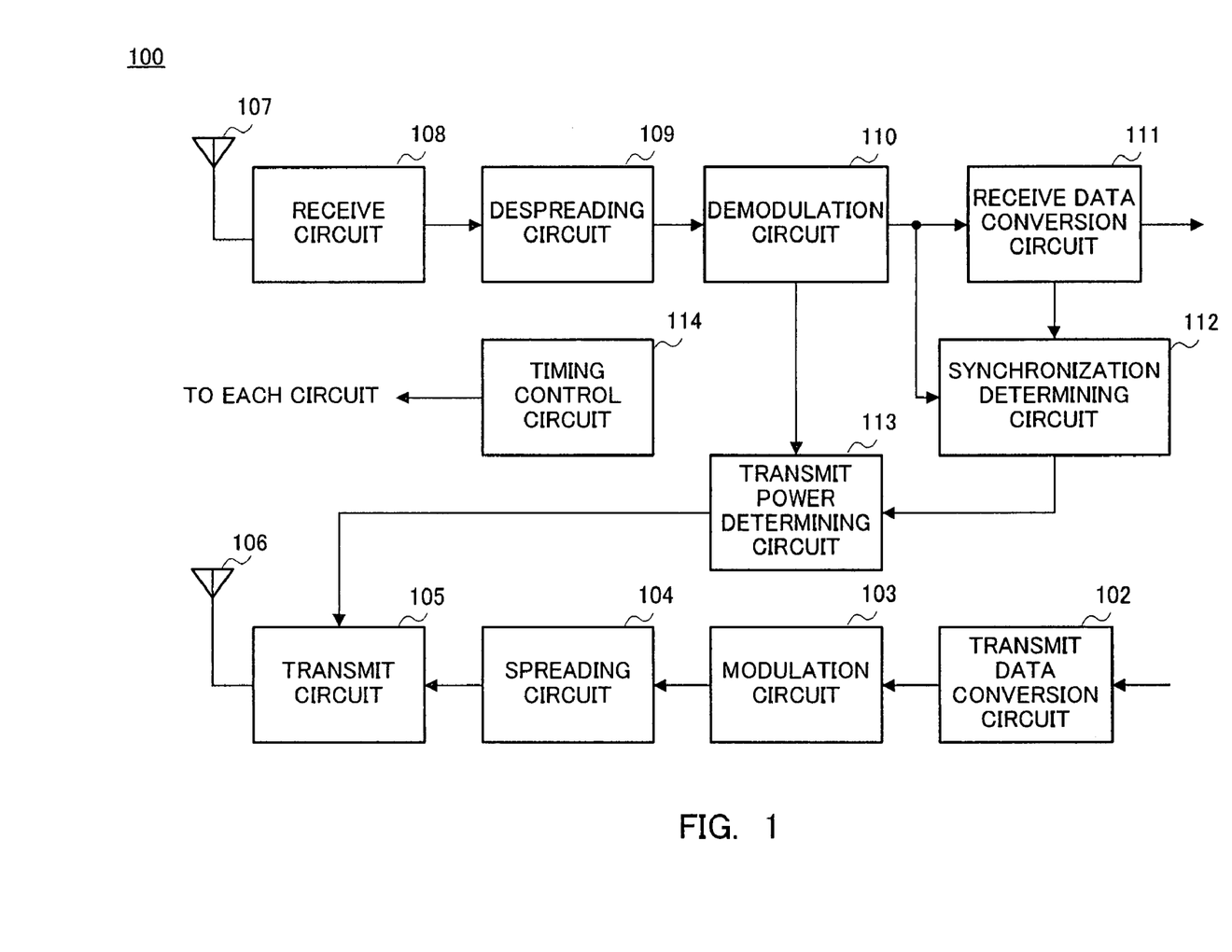
FIG. 1 is a block diagram showing the configuration of a communication apparatus according to embodiment 1 of the present invention.

FIG. 1 is a block diagram showing the configuration of a communication apparatus 100 according to embodiment 1 of the present invention. As shown in FIG. 1, a communication apparatus 100 as a mobile station apparatus comprises a transmit section containing a transmit data conversion circuit 102, a modulation circuit 103, a spreading circuit 104, a transmit circuit 105, and a transmit antenna 106; and a receive section containing a receive antenna 107, a receive circuit 108, a despreading circuit 109, a demodulation circuit 110, and a receive data conversion circuit 111.

The communication apparatus 100 further comprises, as a transmit power control apparatus, a synchronization determining circuit 112 that determines the synchronization of the received data obtained from the receive section and a transmit power determining circuit 113 that controls the transmit power based on the determining results of the synchronization determining circuit 112.

The transmit data conversion circuit 102 forms an input signal into a frame, generates transmit data by performing CRC-encoding and forward error correction(FEC) encoding on the frame signal, and supplies the transmit data to the modulation circuit 103.

The modulation circuit 103 modulates the transmit data supplied from the transmit data conversion circuit 102, and supplies the modulating result to the spreading circuit 104. The spreading circuit 104 performs code-spread processing by multiplying the signal modulated by the modulation circuit 103 by a spreading code, and supplies the code-spread transmit signal to the transmit circuit 105.

The transmit circuit 105 transmits the code-spread transmit signal with the transmit power determined based on a specifying signal for specifying the transmit power value supplied from the transmit power determining circuit 113, to a mobile station via the transmit antenna 106.

The receive circuit 108 converts a received signal received from a mobile station via the receive antenna 107 into a base band signal, and supplies the converted base band signal to the despreading circuit 109.

The despreading circuit 109 recovers its pre-spread data by performing despread process using correlation detection on the input base band signal, and supplies the recovered receive data to the demodulation circuit 110. The demodulation circuit 110 demodulates the receive data despread by the despreading circuit 109, and supplies the demodulating result to the receive data conversion circuit 111.

The receive data conversion circuit 111 performs FEC decoding and CRC detection on the demodulated receive data, and outputs the decoding result.

Figure 2:
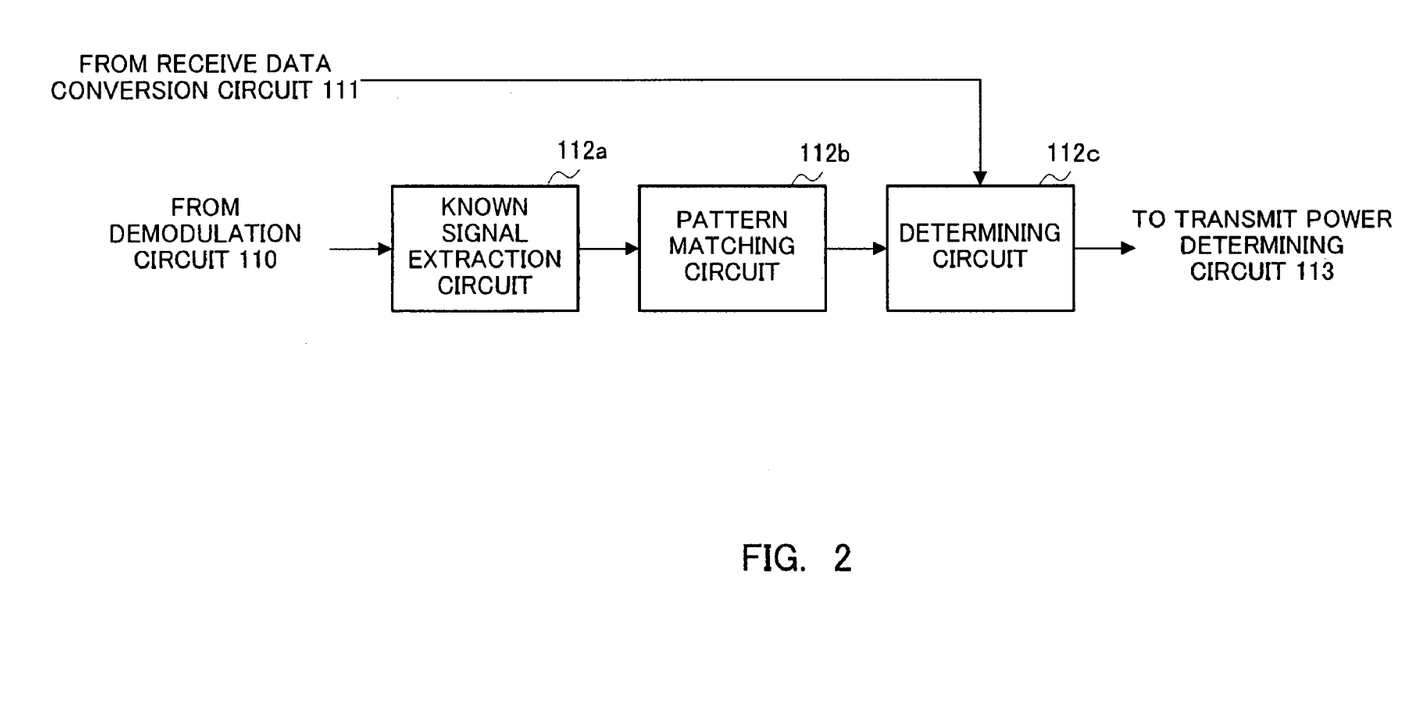
FIG. 2 is a block diagram showing the configuration of a synchronization determining circuit of the communication apparatus according to embodiment 1 of the present invention.

The synchronization determining circuit 112 determines the synchronization state of the received signal based on the receive data demodulated by the demodulation circuit 110, and supplies the transmit power determining circuit 113 with a synchronization determination signal indicating whether synchronization is established or out based on the determining result. FIG. 2 is a block diagram showing the configuration of the synchronization determining circuit 112.

As shown in FIG. 2, the synchronization determining circuit 112 inputs the demodulated signal supplied from the demodulation circuit 110 into a known signal extraction circuit 112a. The known signal extraction circuit 112a extracts a known signal from the demodulated signal, and supplies the extracted signal to a pattern matching circuit 112b.

The pattern matching circuit 112b performs pattern matching on the known signal supplied from the known signal extraction circuit 112a. A determining circuit 112c determines that synchronization is established, when the pattern matching result obtained by the pattern matching circuit 112b indicates that the matching degree is at or above a certain numeric value, and supplies the determining result to the transmit power determining circuit 113.

Note that the synchronization determining circuit 112 may perform the determination using the CRC-error detection result supplied from the receive data conversion circuit 111 and the determination based on the pattern matching result in combination. In this case, the determining circuit 112c determines that synchronization of the received signal is established, when the conditions are met that an error rate, that is, the error detection result supplied from the receive data conversion circuit 111, is within a predetermined range, and that the pattern matching result obtained by the pattern matching circuit 112b indicates that the matching degree is at or above a certain numeric value. Thereby, the reliability of the synchronization determination result can be raised further.

The transmit power determining circuit 113 determines the transmit power based on the synchronization determination signal supplied from the synchronization determining circuit 112, and supplies a specifying signal specifying the determined transmit power value to the transmit circuit 105.

Furthermore, a timing control circuit 114 controls the operation timings and sequences of the entire communication apparatus 100.

Figure 3:
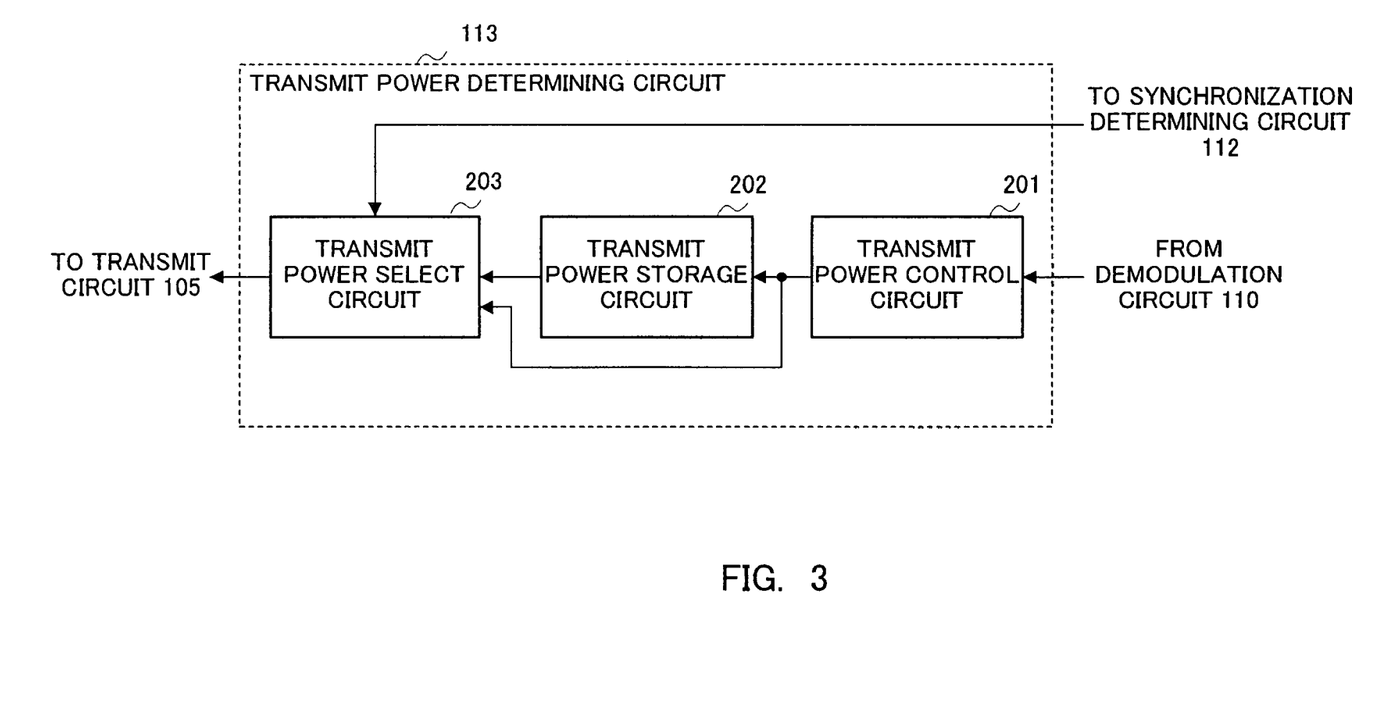
FIG. 3 is a block diagram showing the configuration of a transmit power determining circuit of the communication apparatus according to embodiment 1 of the present invention.

FIG. 3 is a block diagram showing the configuration of the transmit power determining circuit 113 of the communication apparatus 100. As shown in FIG. 3, the transmit power determining circuit 113 receives the demodulated signal supplied from the demodulation circuit 110 by a transmit power control circuit 201. The transmit power control circuit 201 performs closed-loop transmit power control based on the demodulated signal.

The closed-loop transmit power control is the mobile station determines the transmit power of a signal to be sent in return to the base station based on the transmit power control information from the base station.

Here, the transmit power control circuit 201 determines the transmit power value for each slot of the received signal (demodulated signal), and supplies the transmit power sequentially at the timings of the respective slots to each of a transmit power storage circuit 202 and a transmit power select circuit 203.

The transmit power control circuit 201 supplies the transmit power values determined in this way to the transmit power storage circuit 202 and also to the transmit power select circuit 203. The transmit power storage circuit 202 is configured to store transmit power values determined by the transmit power control circuit 201 for the past N times, that is, N slots.

Specifically, when a new transmit power value is supplied from the transmit power control circuit 201, the transmit power storage circuit 202 stores the new transmit power value instead of the earliest transmit power value. Thus the transmit power storage circuit 202 always stores transmit power values for the latest N times (N slots).

The transmit power values stored in the transmit power storage circuit 202 are supplied to the transmit power select circuit 203 at predetermined timings. Specifically, the transmit power select circuit 203 selects one of a real-time transmit power value output from the transmit power control circuit 201 or a past transmit power value stored in the transmit power storage circuit 202 based on the synchronization determination signal supplied from the synchronization determining circuit 112.

In this case, when the synchronization determination signal supplied from the synchronization determining circuit 112 indicates that the synchronization of the demodulated signal is established, the transmit power select circuit 203 determines that the transmit power control follows the received signal and selects a transmit power value output from the transmit power control circuit 201, considering that the transmit power value determined by the transmit power control circuit 201 is reliable.

On the other hand, when the synchronization determination signal supplied from the synchronization determining circuit 112 indicates that the synchronization of the demodulated signal is out, the transmit power select circuit 203 determines that the transmit power control does not follow the received signal, and selects a transmit power value stored in the transmit power storage circuit 202 instead of the transmit power value output from the transmit power control circuit 201 considering that the transmit power value determined by the transmit power control circuit 201 is hardly reliable.

Note that the synchronization determining circuit 112 determines the synchronization state for each frame of the received signal (demodulated signal). Therefore, when determining that the synchronization is out, the synchronization determining circuit 112 determines that the transmit power control does not follow the received signal during all slots of the frame for which it determines.

Therefore, when receiving a determination result that the synchronization is out via the synchronization determination signal supplied from the synchronization determining circuit 112, the transmit power select circuit 203 reads out a transmit power value earlier by one frame, i.e. N slots composing the frame, from the transmit power storage circuit 202.

Then the transmit power select circuit 203 determines a transmit power value to be actually supplied to the transmit circuit 105 based on the N'th past reliable transmit power value read out from the transmit power storage circuit 202. Specifically, the transmit power select circuit 203 changes, over a predetermined number of slots' times, the transmit power value being supplied to the transmit circuit 105, as a target, the N'th past transmit power value read out from the transmit power storage circuit 202. By thus gradually changing the transmit power value being supplied to the transmit circuit 105 over a predetermined period rather than changing to the N'th past one at one time, the operation of the transmit circuit 105 becomes stable.

Figure 4:
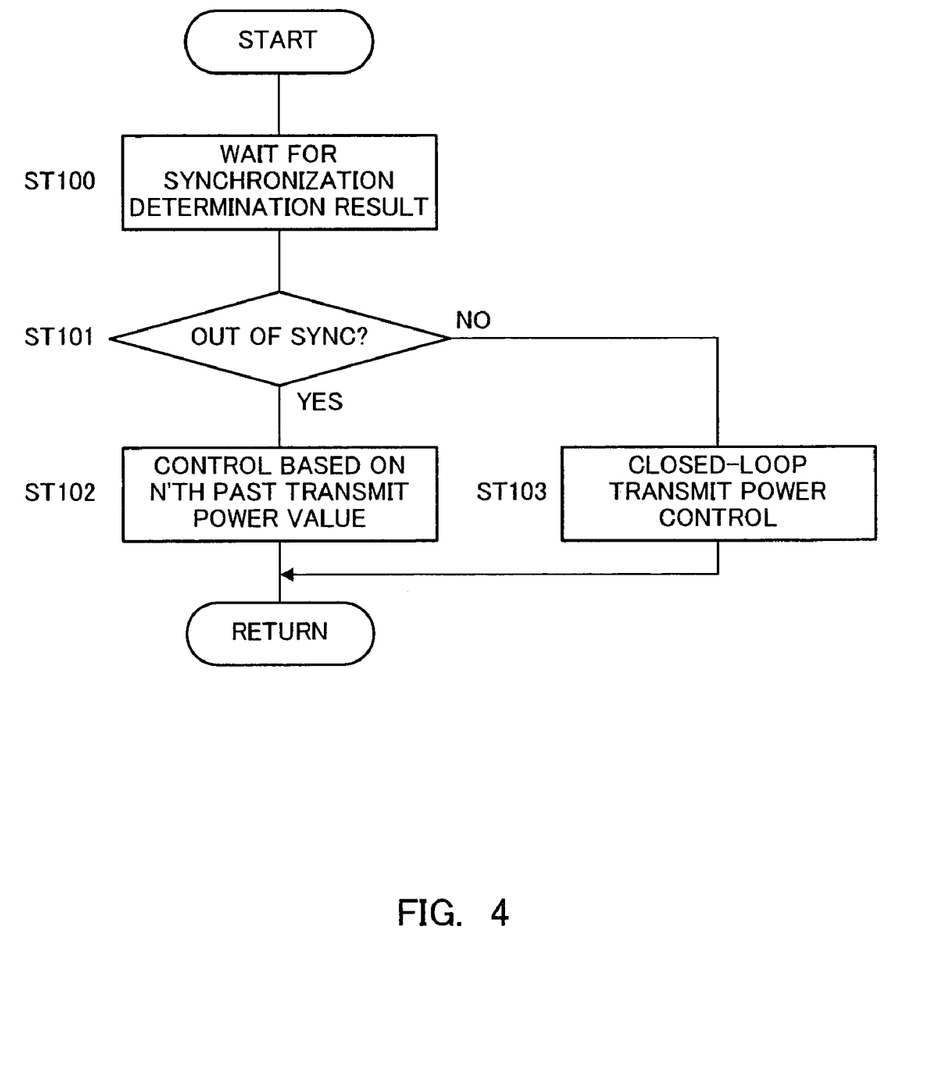
FIG. 4 is a flow chart for explaining the operation of the communication apparatus according to embodiment 1 of the present invention.

FIG. 4 is a flow chart showing the procedure of setting the transmit power by transmit power determining circuit 113. As shown in FIG. 4, the transmit power determining circuit 113, in step ST100, waits for the synchronization determination signal to be supplied from the synchronization determining circuit 112. When the synchronization determination signal is supplied, step ST101 is taken where the transmit power determining circuit 113 determines whether or not the synchronization is out from the synchronization determination result denoted by the then supplied synchronization determination signal.

When the result is negative, which means that the synchronization is established, step ST103 is taken where the transmit power select circuit 203 of the transmit power determining circuit 113 selects the transmit power value output from the transmit power control circuit 201 mentioned above with reference to FIG. 3 to supply the transmit power value output from the transmit power control circuit 201, as it is, to the transmit circuit 105. Thus, the closed-loop transmit power control continues in the transmit power control circuit 201.

On the other hand, when the result is affirmative in step ST 101, which means that the synchronization is out, step ST102 is taken where the transmit power select circuit 203 of the transmit power determining circuit 113 selects a past transmit power stored in the transmit power storage circuit 202.

In this case, the transmit power select circuit 203 selects and reads out the transmit power value earlier by N slots (N=15) from among the past transmit power values stored in the transmit power storage circuit 202. Specifically, in the CDMA communication scheme of the present embodiment, the transmit power value earlier by N slots (N=15) means the transmit power value corresponding to the last slot of the past frame because one frame of the sent and received signals consists of 15 slots.

Note that synchronization determination in the synchronization determining circuit 112 is performed for each frame, so that, when the out-of-sync state is detected, the transmit power value corresponding to the slot earlier by N slots (N=15) becomes the transmit power value corresponding to the last slot of the past frame where the synchronization was established. Thus, the transmit power value corresponding to the most recent slot in the state where the synchronization is established is read out by the out-of-sync state from the transmit power storage circuit 202.

Then the transmit power determining circuit 113, in step ST102, controls the transmit power value to gradually change from the transmit power value immediately before the out-of-sync state is detected to the N slots past transmit power value read out from the transmit power storage circuit 202 over a predetermined period based on the N slots past transmit power value read out from the transmit power storage circuit 202. Note that the transmit power select circuit 203 stores the value of the transmit power just before supplied to the transmit circuit 105 each time.

Figure 5:
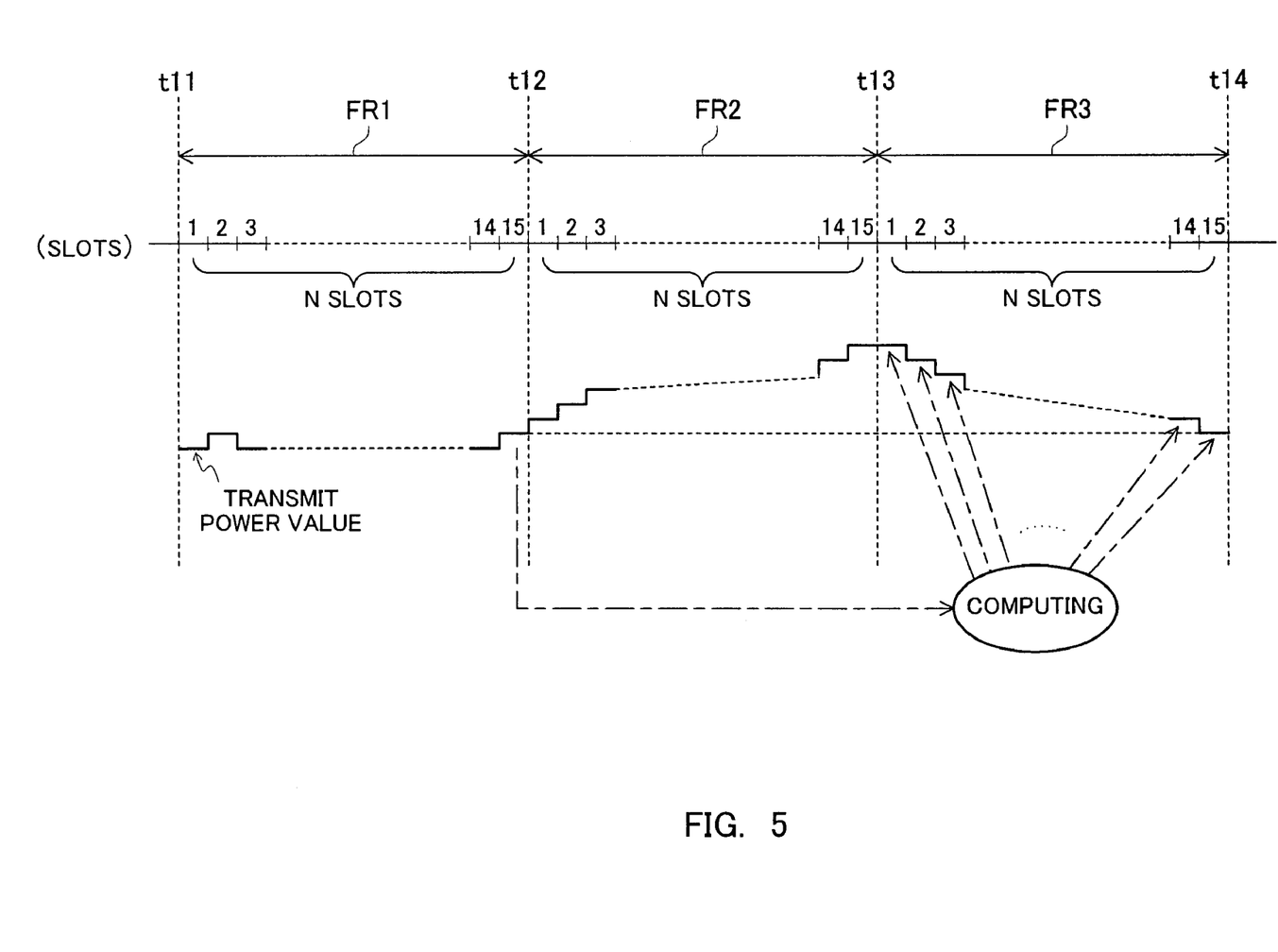
FIG. 5 is a schematic view for explaining the operation of the communication apparatus according to embodiment 1 of the present invention.

FIG. 5 is a schematic view for explaining the control of changing the transmit power value to the N slots past transmit power value by the transmit power select circuit 203. As shown in FIG. 5, in frames FR1, FR2, FR3, and the like, each consisting of 15 slots, the transmit power value is controlled to follow the level of the received signal by the closed-loop transmit power control of the transmit power control circuit 201 in the synchronization-established state as shown in, for example, the frame FR1.

On the other hand, when the out-of-sync state is detected in, for example, the frame FR2, the out-of-sync state is recognized by the transmit power determining circuit 113 receiving the synchronization determination signal at time t13. Hence, at time t13 the transmit power select circuit 203 detects the out-of-sync state from the synchronization determination signal, and selects the N slots past transmit power value from among the transmit power values for the past N slots (N=15) stored at that time in the transmit power storage circuit 202, output from the transmit power control circuit 201. This selected the N slots past transmit power value is the transmit power value corresponding to the last slot of the past frame FR1 where the synchronization was established, just before the out-of-sync state is detected in FIG. 5.

As described above, the transmit power value in the transmit power storage circuit 202 which is to be selected when the transmit power select circuit 203 detects the out-of-sync state is a transmit power value at the most recent timing from among the past transmit power values determined under reliable conditions.

Then the transmit power select circuit 203 calculates the transmit power value to be supplied to the transmit circuit 105 based on the transmit power value selected and read out in this way from the transmit power storage circuit 202 (step ST102). Specifically, as shown in FIG. 5, the transmit power value is changed from the transmit power value corresponding to the last slot of the frame FR2 where the out-of-sync state was detected to the N slots past transmit power value (the transmit power value of the last slot of the frame FR1) by steps over a predetermined number of steps, i.e., over the one-frame period of the frame FR3 following the frame FR2 where the out-of-sync state was detected, based on the N slots past transmit power value (the last transmit power value of, e.g., the frame FR1 where the synchronization was established), while the changed and calculated transmit power value is supplied to the transmit circuit 105 at the timing of each slot of the frame FR3, which is a timing for supplying the transmit power value to the transmit circuit 105. Note that in the present embodiment, the transmit power select circuit 203 changes the transmit power by steps over the same number of steps as the number of slots of one frame (15 slots).

In this manner, the transmit power value determined in the frame FR2 in the out-of-sync state is gradually returned to a reliable transmit power value during the frame FR3 following the frame FR2. As described above, the transmit power control circuit 201 can perform the closed-loop transmit power control following the transmit power controlled by the transmit power select circuit 203 because the transmit power value does not rapidly change.

Note that if the synchronization is still out after the processing in step ST102, the transmit power select circuit 203 maintains the transmit power value controlled in step ST102. Then, when the synchronization is restored, the transmit power value output from the transmit power control circuit 201 is selected.

As described above, according to the communication apparatus 100, when the synchronization of the received signal is established, the transmit power control is performed using a transmit power value obtained by the closed-loop transmit power control by the transmit power control circuit 201, and when the synchronization of the received signal is out, the transmit power can be controlled avoiding rapid changes thereof by controlling the transmit power value to gradually return over a predetermined period to a transmit power value determined at a timing closest to the current timing from among the past reliable transmit power values determined when the synchronization was established, so that the transmit power control in the transmit power control circuit 201 can function smoothly even when the transmit power control in the transmit power select circuit 203 deviates from the processing loop of the closed-loop transmit power control by the transmit power control circuit 201. Thus, the transmit and receive quality of the CDMA scheme can be secured.

While the above embodiment describes the case where the transmit power select circuit 203 makes the transmit power value converge to a target transmit power value by steps over the steps of one frame (15 slots) when the synchronization is out, the present invention is not limited to this. The point is to make the transmit power value gradually converge to a target value. For example, the transmit power value may be made to converge to a target transmit power value by steps over the steps of a half frame. The number of steps over which to make the transmit power value converge to a target value can thus take various numbers.

Moreover, the above embodiment has described the case where the circuit sections of the transmit power determining circuit 113 performs the processing described above with reference to FIG. 4, but the present invention is not limited to this. A computer may be configured to execute the processing procedure. In this case, it is required only that, having the processing procedure described above with reference to FIG. 4 stored as a program in a recording medium such as an optical disk, the computer be made to execute the program read out from the recording medium.

Furthermore, the above embodiment has described the case of applying the present invention to a mobile station apparatus, but the present invention is not limited to this. Applying the present invention to a base station apparatus can also achieve the same above effect.

EMBODIMENT 2

Figure 6:
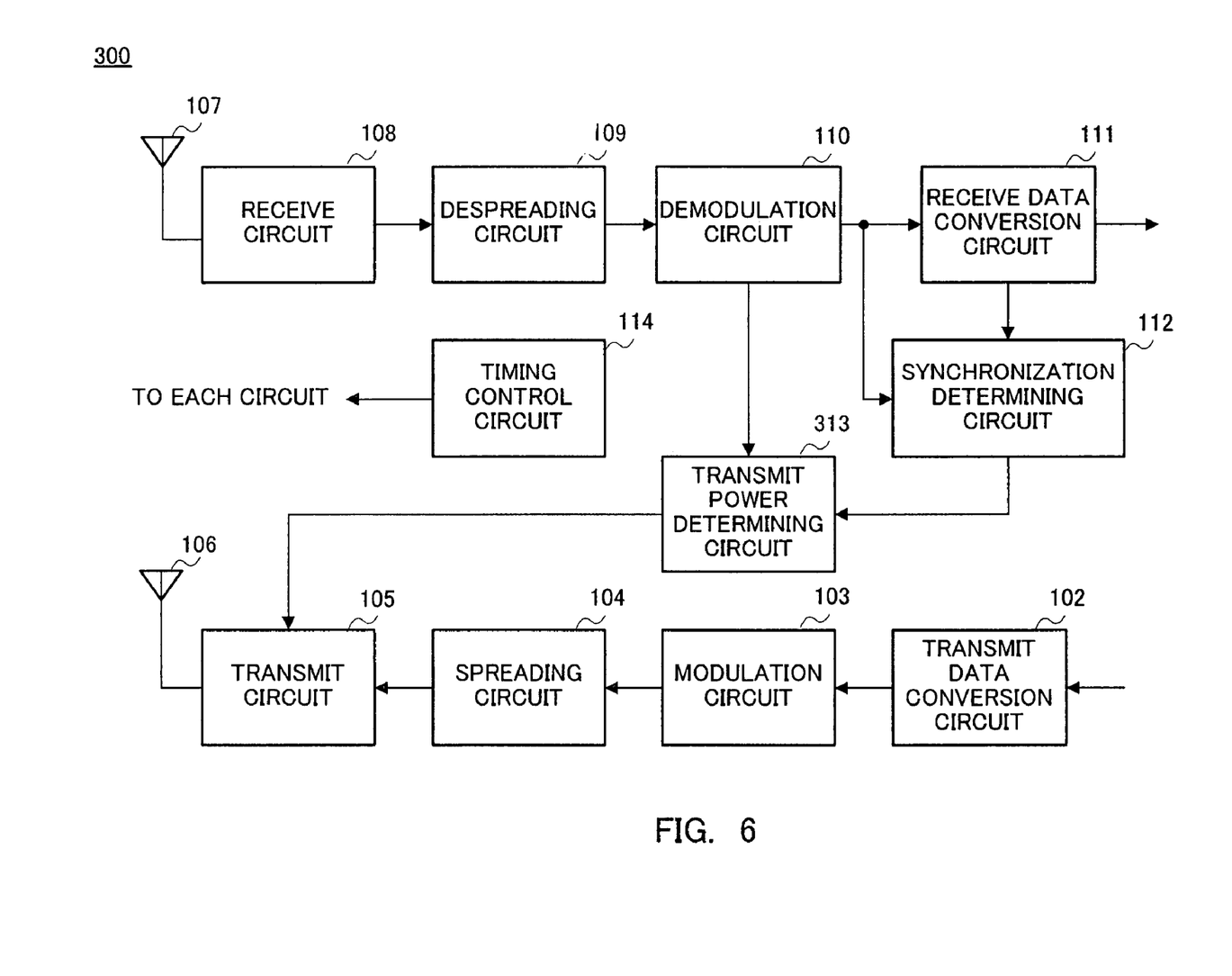
FIG. 6 is a block diagram showing the configuration of a communication apparatus according to embodiment 2 of the present invention.

FIG. 6 is a block diagram showing the configuration of a communication apparatus 300 according to embodiment 2 of the present invention. The same parts as in FIG. 1 are denoted by the same reference numerals with a detailed description thereof omitted.

Figure 7:
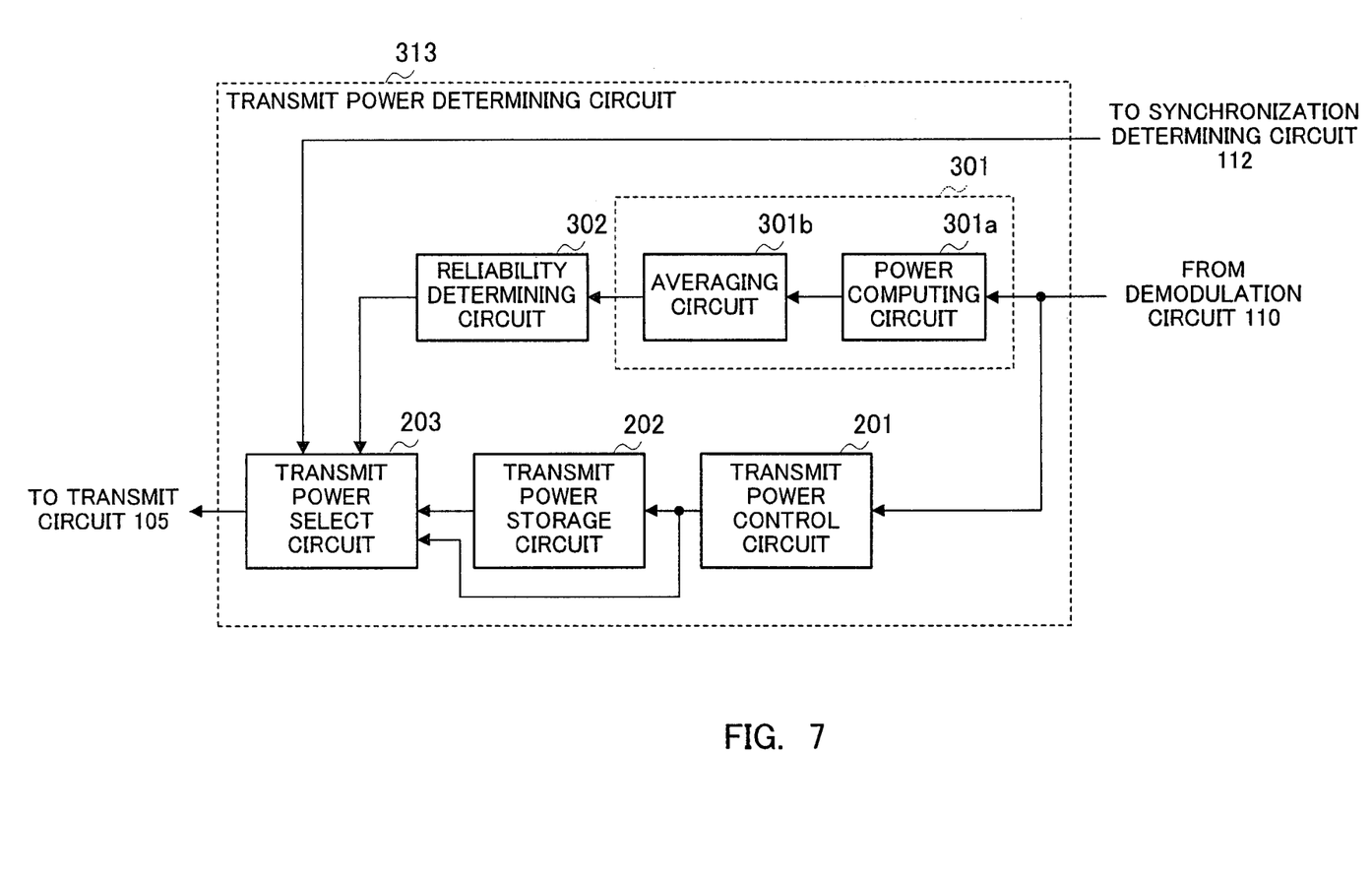
FIG. 7 is a block diagram showing the configuration a transmit power determining circuit of the communication apparatus according to embodiment 2 of the present invention.

The communication apparatus 300 shown in FIG. 6 differs from the communication apparatus 100 described above with reference to FIG. 1 in the configuration of the transmit power determining circuit 313, and the others are the same. FIG. 7 is a block diagram showing the configuration of the transmit power determining circuit 313. The same parts as in FIG. 3 are denoted by the same reference numerals with a detailed description thereof omitted. As shown in FIG. 7, the transmit power determining circuit 313 receives the demodulated signal supplied from the demodulation circuit 110 by the transmit power control circuit 201. The transmit power control circuit 201 performs closed-loop transmit power control based on the demodulated signal.

The transmit power control circuit 201 is configured to determine the transmit power value for each slot of the received signal (demodulated signal), and supplies the determined transmit power sequentially at the timings of the respective slots to each of the transmit power storage circuit 202 and the transmit power select circuit 203.

The transmit power storage circuit 202 stores transmit power values supplied from the transmit power control circuit 201 for the past N slots. The transmit power select circuit 203 selects one of a real-time transmit power value output from the transmit power control circuit 201 or a past transmit power value stored in the transmit power storage circuit 202 based on the synchronization determination signal supplied from the synchronization determining circuit 112.

Upon detecting that the synchronization of the received signal is out via the synchronization determination signal, the transmit power select circuit 203 reads out the N-slots past transmit power value stored in the transmit power storage circuit 202, and controls the transmit power value being supplied to the transmit circuit 105 based on the N-slots past transmit power value in the way described above with reference to FIG. 5.

In addition to this configuration, the transmit power determining circuit 313 further comprises a reliability detection circuit 301 and a reliability determining circuit 302, and the reliability detection circuit 301 detects reliability of the demodulated signal based on the demodulated signal supplied from the demodulation circuit 110.

Specifically, the reliability detection circuit 301 receives the demodulated signal supplied from the demodulation circuit 110 by a power computing circuit 301a. The power computing circuit 301a computes a power value $(I^2+Q^2)$ for the demodulated signal (I/Q signal) for each symbol, and supplies the computing result to a subsequent averaging circuit 301b.

The averaging circuit 301b averages power values supplied from the power computing circuit 301a over a plurality of slots, and obtains the reliability of the demodulated signal (received signal) based on the averaging result. As this reliability, the receive level, an interference level, SIR (Signal to Interference Ratio) and BER (Bit Error Rate) can be used. In the present embodiment, the case of using the receive level of the demodulated signal as the reliability will be described.

The reliability detection circuit 301 supplies such reliability information (averaged level of the received signal over a plurality of symbols) to the reliability determining circuit 302. The reliability determining circuit 302 determines the reliability of the demodulated signal based on the reliability information supplied from the reliability detection circuit 301. The method of the determining is that the reliability determining circuit 302 determines whether or not the demodulated signal is reliable depending on whether the reliability information is greater than a predetermined threshold value.

For example, when the receive level, which is the reliability information, is greater than the predetermined threshold value, it is determined that the reliability of the demodulated signal is high, and on the other hand, when the receive level is less than the predetermined threshold value, it is determined that the reliability of the demodulated signal is low.

The reliability of the demodulated signal determined in this way is supplied as a reliability determination signal from the reliability determining circuit 302 to the transmit power select circuit 203. The transmit power select circuit 203 selects one of a real-time transmit power value output from the transmit power control circuit 201 or a past transmit power value stored in the transmit power storage circuit 202 based on the synchronization determination signal supplied from the synchronization determining circuit 112 and the reliability determination signal supplied from the reliability determining circuit 302.

When selecting the transmit power value directly input from the transmit power control circuit 201, the transmit power select circuit 203 supplies the selected transmit power value, as it is, to the transmit circuit 105, and when selecting a past transmit power value stored in the transmit power storage circuit 202, the transmit power select circuit 203 computes a transmit power value based on the selected transmit power value by using the method described above with reference to FIG. 5, and supplies the computed transmit power value to the transmit circuit 105.

Figure 8:
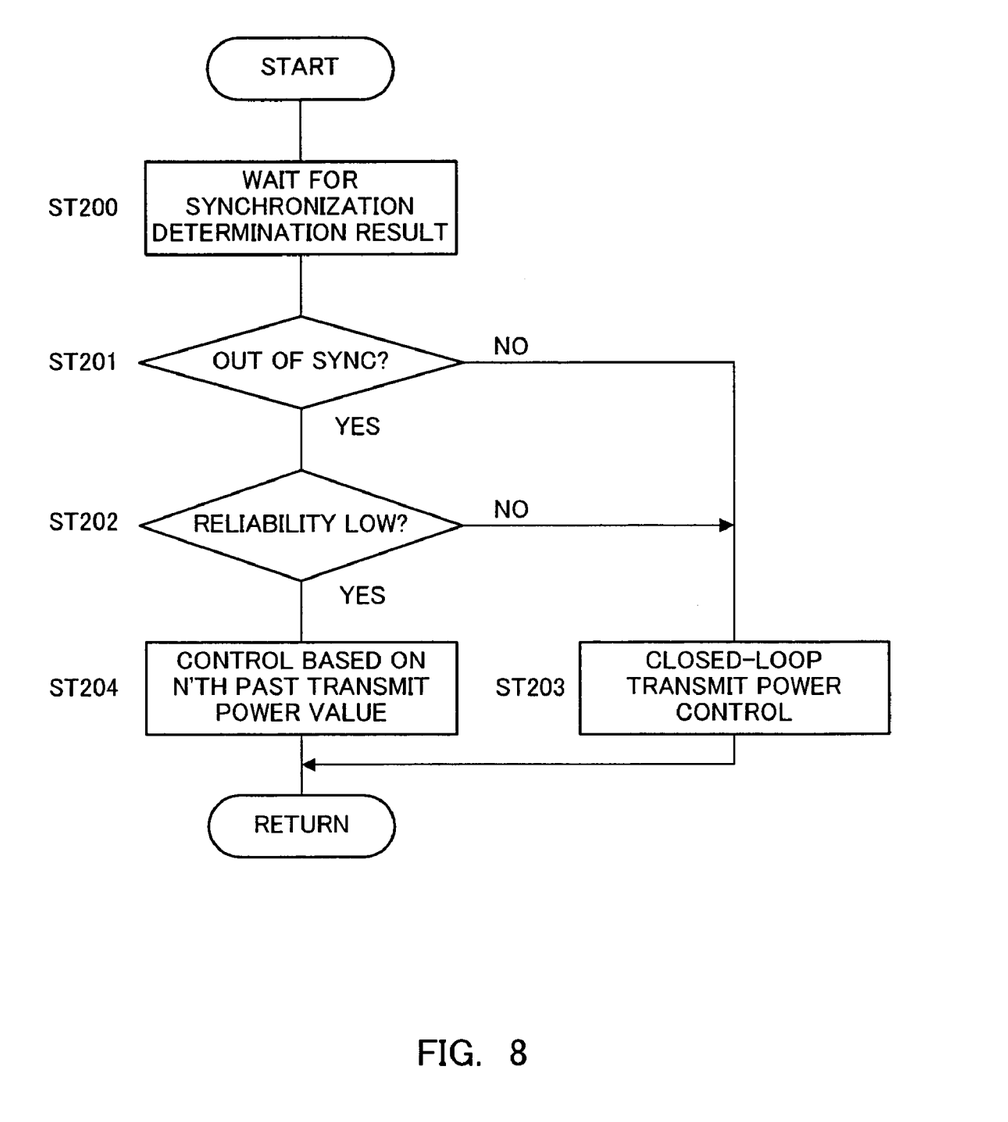
FIG. 8 is a flow chart for explaining the operation of the communication apparatus according to embodiment 2 of the present invention.

FIG. 8 is a flow chart showing the procedure of setting the transmit power by transmit power determining circuit 313. As shown in FIG. 8, the transmit power determining circuit 313, in step ST200, waits for the synchronization determination signal to be supplied from the synchronization determining circuit 112. When the synchronization determination signal is supplied, step ST201 is taken where the transmit power determining circuit 313 determines whether or not the synchronization is out from the synchronization determination result denoted by the synchronization determination signal supplied.

When the result is negative, which means that the synchronization is established, step ST203 is taken where the transmit power select circuit 203 of the transmit power determining circuit 313 selects the transmit power value output from the transmit power control circuit 201 mentioned with reference to FIG. 7 to supply the transmit power value output from the transmit power control circuit 201, as it is, to the transmit circuit 105. Thus, the closed-loop transmit power control continues in the transmit power control circuit 201.

On the other hand, when the result in step ST201 is affirmative, which means that the synchronization is out, step ST202 is taken where the transmit power select circuit 203 of the transmit power determining circuit 313 determines whether or not the reliability is low based on the reliability information output from the reliability determining circuit 302. When the result is negative, which means that the reliability is not reduced while the synchronization is out, step ST203 is taken where the transmit power select circuit 203 of the transmit power determining circuit 313 selects the transmit power value output from the transmit power control circuit 201 to supply the transmit power value output from the transmit power control circuit 201, as it is, to the transmit circuit 105.

On the other hand, when the result in step ST202 is affirmative, which means that the synchronization is out and the reliability of the demodulated signal (received signal) is low, step ST204 is taken where the transmit power select circuit 203 of the transmit power determining circuit 313 selects a past transmit power value stored in the transmit power storage circuit 202.

The process in step ST204 is the same as that in step ST102 described above with reference to FIG. 4. The transmit power select circuit 203 selects and reads out the transmit power value earlier by N slots (N=15) from among the past transmit power values stored in the transmit power storage circuit 202, and according to the method described above with reference to FIG. 5, controls the transmit power value to gradually change over a predetermined period from the transmit power value immediately before the out-of-sync state is detected to the N slots past transmit power value read out from the transmit power storage circuit 202.

In this manner, the transmit power determining circuit 313 continues the closed-loop transmit power control as long as the reliability of the received signal (demodulated signal) is high, even when the synchronization is out. Thus, provided that the closed-loop transmit power control is unlikely to be affected substantially if the received signal (demodulated signal) is reliable, in such cases, the frequent occurrence of the control in deviation from the closed-loop transmit power control such as described above with reference to FIG. 5 can be avoided by continuing the closed-loop transmit power control. Thus, the closed-loop transmit power control can be performed stably.

On the other hand, when the synchronization of the received signal is out, the transmit power determining circuit 313 switches from the closed-loop transmit power control by the transmit power control circuit 201 to the transmit power value control based on a past transmit power value by the transmit power select circuit 203 as long as the reliability of the received signal (demodulated signal) is low. Thus, when having fallen into a state where the closed-loop transmit power control has difficulty in following, the transmit power control described above with reference to FIG. 4 is immediately performed in deviation from the closed-loop transmit power control. As a result, the transmit power determining circuit 313 does not follow instantaneous variations of the received signal that it would follow if the closed-loop transmit power control were being used.

In this manner, the transmit power determining circuit 313 continues communication as far as possible, and immediately after detecting that the communication is out, switches from the closed-loop transmit power control to the transmit power control based on a past transmit power value. Thus, the transmit power value varies stably without following rapid changes of the received signal. Because the transmit power value varies stably in this way, the possibility that the current transmit power value has become transmit power value that the closed-loop transmit power control can follow is high, when the communication connection is resumed after being in the communication-out state. Hence, stable return to the closed-loop transmit power control is possible in resuming the communication.

Note that when the synchronization is still out after the process in step ST204, the transmit power select circuit 203 is configured to maintain the transmit power value controlled in step ST204, and after that, when the synchronization is restored, the transmit power value output from the transmit power control circuit 201 is selected.

As described above, according to the communication apparatus 300, when the synchronization of the received signal is established, the transmit power control is performed using a transmit power value obtained by the closed-loop transmit power control by the transmit power control circuit 201, and when the synchronization of the received signal is out, rapid changes of the transmit power value in controlling can be avoided by controlling the transmit power value to gradually return over a predetermined period to a transmit power value determined at a timing closest to the current timing from among past reliable transmit power values determined when the synchronization was established, as long as the reliability of the received signal is low. Thus, even after the transmit power control based on a past transmit power value by the transmit power select circuit 203 has been performed in deviation from the processing loop (of the closed-loop transmit power control) by the transmit power control circuit 201, the transmit power control by the transmit power control circuit 201 can be made to function smoothly. Therefore, the transmit and receive quality of the CDMA scheme can be secured.

While the above embodiment describes the case where the transmit power select circuit 203 makes the transmit power value converge to a target transmit power value by steps over the steps of one frame (15 slots) when the synchronization is out, the present invention is not limited to this. The point is to make the transmit power value gradually converge to a target value. For example, the transmit power value may be made to converge to a target transmit power value by steps over the steps of a half frame. The number of steps over which to make the transmit power value converge to a target value can thus take various numbers.

Moreover, the above embodiment has described the case where the circuit sections of the transmit power determining circuit 313 perform the processing described above with reference to FIG. 8, but the present invention is not limited to this. A computer may be configured to execute the processing procedure. In this case, it is required only that, having the processing procedure described above with reference to FIG. 8 stored as a program in a recording medium such as an optical disk, the computer be made to execute the program read out from the recording medium.

Furthermore, the above embodiment has described the case of applying the present invention to a mobile station apparatus, but the present invention is not limited to this. Applying the present invention to a base station apparatus can also achieve the same effect as above.

EMBODIMENT 3

Figure 9:
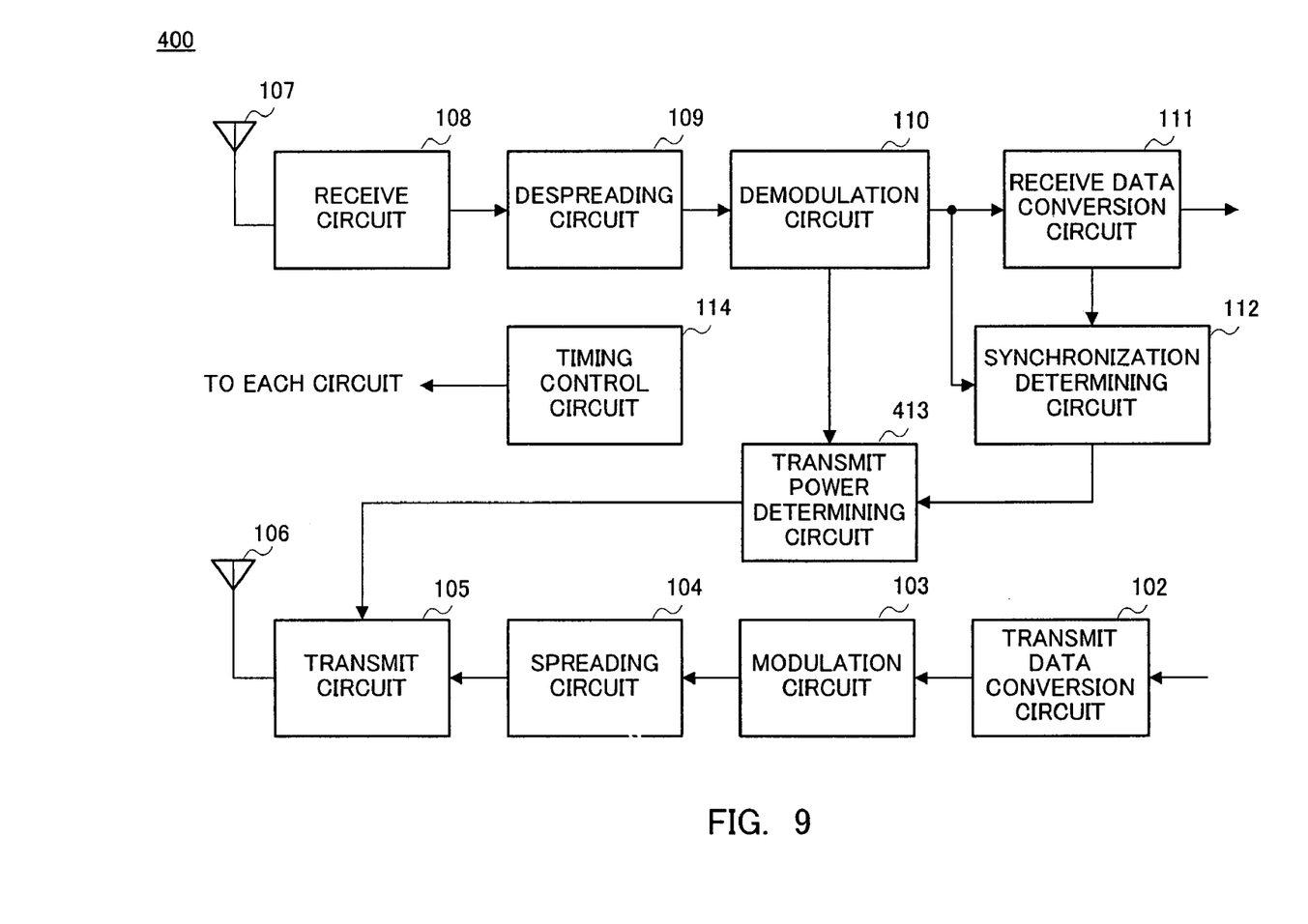
FIG. 9 is a block diagram showing the configuration of a communication apparatus according to embodiment 3 of the present invention.

FIG. 9 is a block diagram showing the configuration of a communication apparatus 400 according to embodiment 3 of the present invention. The same parts as in FIG. 6 are denoted by the same reference numerals with a detailed description thereof omitted.

Figure 10:
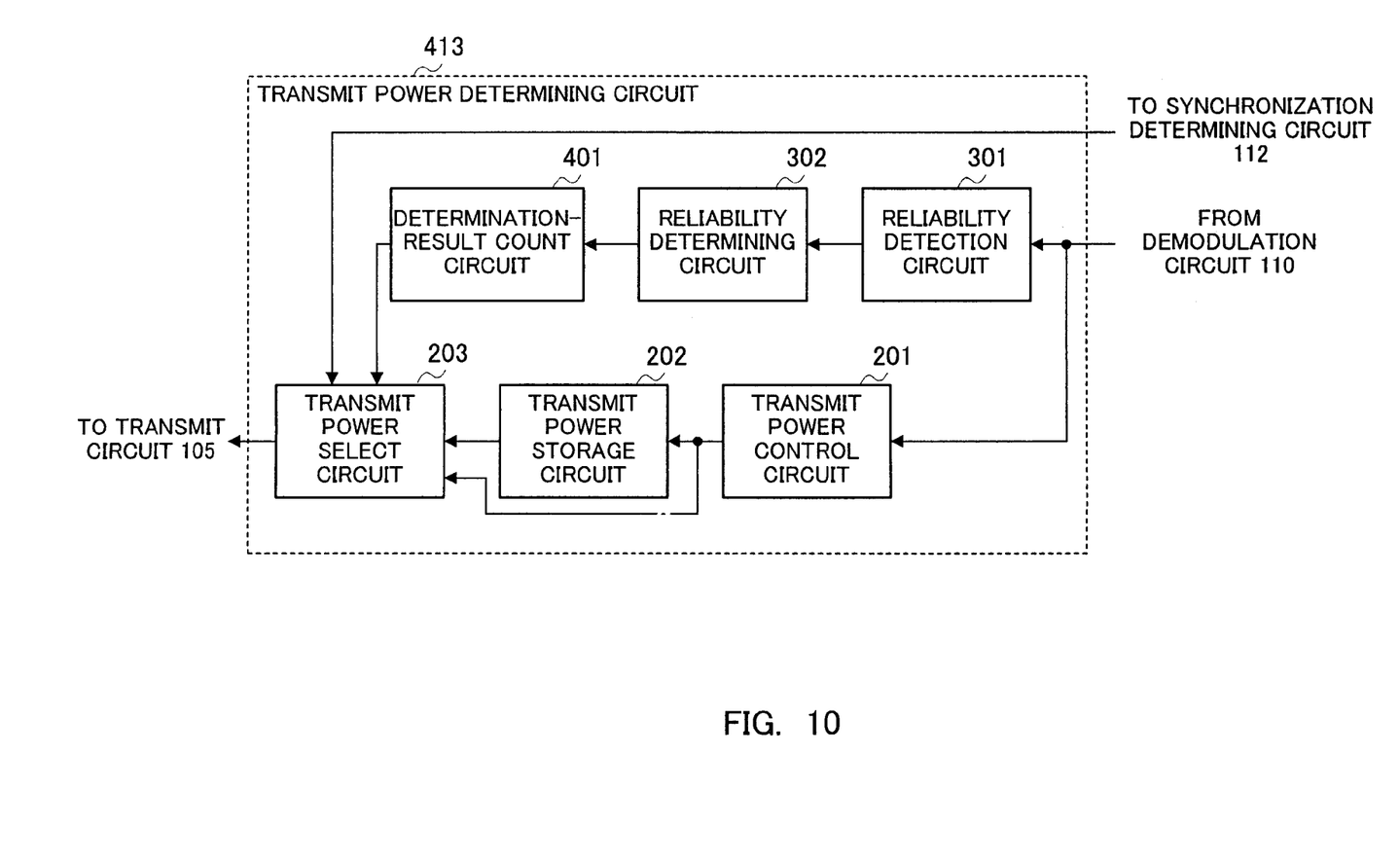
FIG. 10 is a block diagram showing the configuration a transmit power determining circuit of the communication apparatus according to embodiment 3 of the present invention.

The communication apparatus 400 shown in FIG. 9 differs from the communication apparatus 300 described above with reference to FIG. 6 in the configuration of the transmit power determining circuit 413, and the others are the same. FIG. 10 is a block diagram showing the configuration of the transmit power determining circuit 413. The same parts as in FIG. 7 are denoted by the same reference numerals with a detailed description thereof omitted.

As shown in FIG. 10, the transmit power determining circuit 413 supplies a reliability determination signal output from the reliability determining circuit 302 to a determination-result count circuit 401.

The determination-result count circuit 401, when the reliability determination signal supplied from the reliability determining circuit 302 indicates the reliability being low, performs count. A minimum unit for the count operation is a slot, but instead the average of per-slot reliability-determination results for a predetermined number of slots may be used. When the count value has reached a predetermined value, the determination result is notified to the transmit power select circuit 203.

Note that each time the reliability signal supplied from the reliability determining circuit 302 indicates the reliability being high, the determination-result count circuit 401 resets the count value to zero. Thus, only when the reliability determination signal supplied from the reliability determining circuit 302 indicates the reliability is high consecutively, the number of consecutive times of high reliability becomes greater than a predetermined number k, and only when being greater than the predetermined number k, the determination-result count circuit 401 notifies the determination result to the transmit power select circuit 203.

Therefore, only when the reliability is low consecutively, the transmit power select circuit 203 performs the transmit power control (FIG. 5) using a past transmit power value stored in the transmit power storage circuit 202 instead of the transmit power value output from the transmit power control circuit 201.

Figure 11:
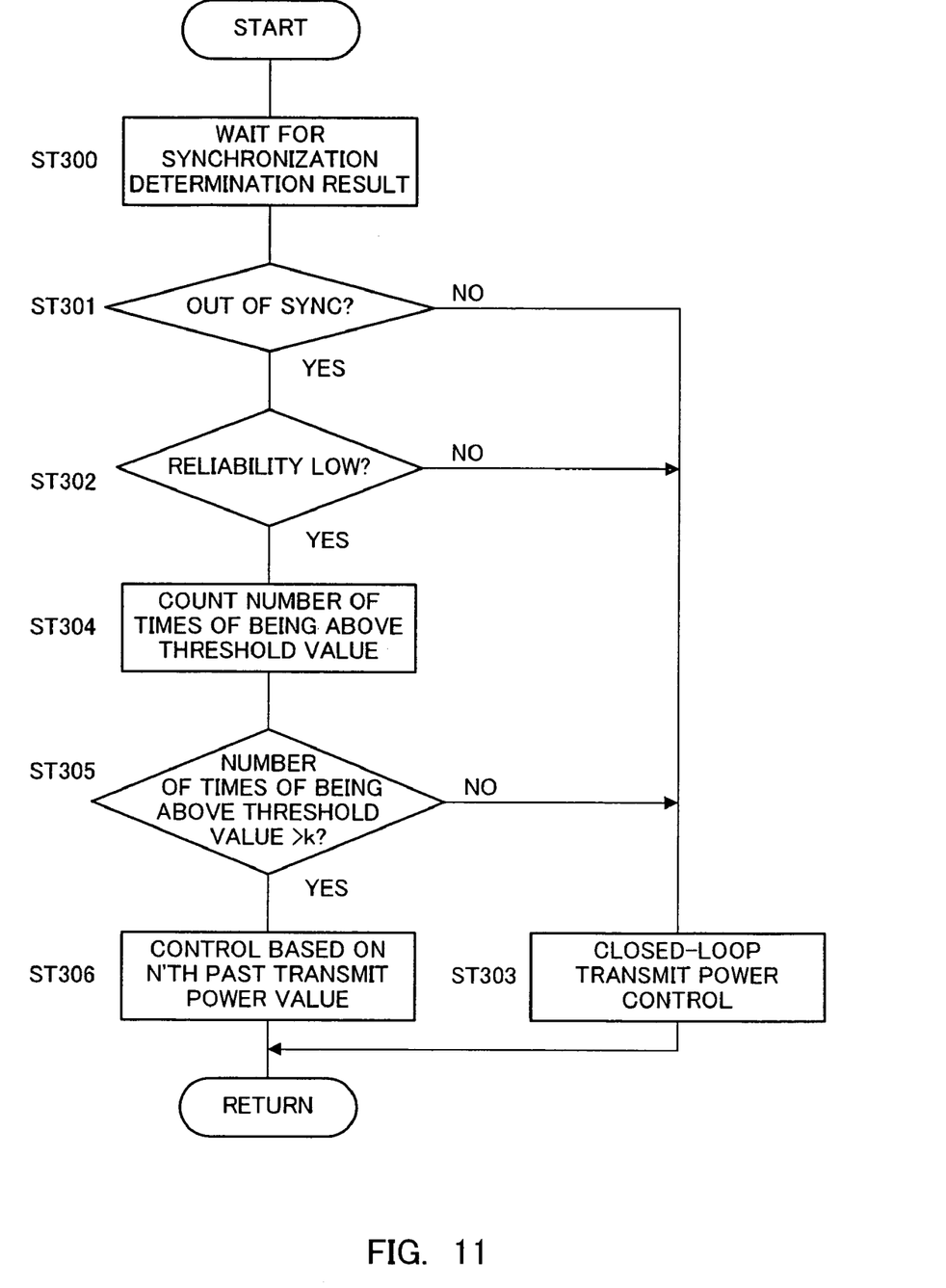
FIG. 11 is a flow chart for explaining the operation of the communication apparatus according to embodiment 3 of the present invention.

FIG. 11 is a flow chart showing the procedure of setting the transmit power by the transmit power determining circuit 413. As shown in FIG. 11, the transmit power determining circuit 413, in step ST300, waits for the synchronization determination signal to be supplied from the synchronization determining circuit 112. When the synchronization determination signal is supplied, step ST301 is taken where the transmit power determining circuit 413 determines whether or not the synchronization is out from the synchronization determination result denoted by the synchronization determination signal supplied.

When the result is negative, which means that the synchronization is established, step ST303 is taken where the transmit power select circuit 203 of the transmit power determining circuit 413 selects the transmit power value output from the transmit power control circuit 201 mentioned with reference to FIG. 7 to supply the transmit power value output from the transmit power control circuit 201, as it is, to the transmit circuit 105. Thus, the closed-loop transmit power control continues in the transmit power control circuit 201.

On the other hand, when the result in step ST301 is affirmative, which means that the synchronization is out, step ST302 is taken where the determination-result count circuit 413 determines whether or not the reliability of the demodulated signal (received signal) is low based on reliability information output from the reliability determining circuit 302.

When the result is negative, which means that the transmit power select circuit 203 of the transmit power determining circuit 413 has not yet received the result of determining the count value from the determination-result count circuit 401, that is, the reliability is not reduced while the synchronization is out, the transmit power select circuit 203 selects the real-time transmit power value supplied from the transmit power control circuit 201 to continue the closed-loop transmit power control.

On the other hand, when the result in step ST302 is affirmative, which means that the reliability determining circuit 302 has supplied the reliability information indicating the reliability of the demodulated signal being reduced to the determination-result count circuit 401, the transmit power determining circuit 413 counts the number of times of having received the reliability information indicating low reliability by the determination-result count circuit 401, and increments the count value stored in a memory circuit (not shown in the drawing).

In this case, when the reliability information supplied from the reliability determining circuit 302 indicates the reliability being high, the determination-result count circuit 401 resets the count value stored in the memory circuit to zero. Thus, only when low reliability is detected consecutively, the count value reaches the predetermined number of times k.

Then the transmit power determining circuit 413, in step ST305, determines whether or not the counting result of the determination-result count circuit 401 is greater than the predetermined number of times k, that is, whether the reliability determining circuit 302 has determined consecutively that the reliability of the demodulated signal is low, by the determination-result count circuit 401.

When the result is negative, which means that the reliability of the demodulated signal being low does not continue to reach the predetermined number of times k, the transmit power select circuit 203 of the transmit power determining circuit 413 selects the real-time transmit power value supplied from the transmit power control circuit 201 to continue the closed-loop transmit power control.

On the other hand, when the result in step ST305 is affirmative, which means that the reliability of the demodulated signal is consecutively low, the determination-result count circuit 401 supplies the determination result to the transmit power select circuit 203, and step ST306 is taken where the transmit power select circuit 203 of the transmit power determining circuit 413 selects a past transmit power value stored in the transmit power storage circuit 202.

The process of step ST306 is the same as that of step ST102 described above with reference to FIG. 4, the transmit power select circuit 203 selects and reads out the transmit power value earlier by N slots (N=15) from among the past transmit power values stored in the transmit power storage circuit 202, and the transmit power value is controlled to gradually change from the transmit power value immediately before the out-of-sync state is detected to the N slots past transmit power value read out from the transmit power storage circuit 202 over a predetermined period according to the method described above with reference to FIG. 5.

In this manner, even when the synchronization of the received signal is out, the transmit power determining circuit 413 continues the closed-loop transmit power control as long as the reliability of the received signal (demodulated signal) is high. Thus, provided that the closed-loop transmit power control is unlikely to be affected substantially if the received signal (demodulated signal) is reliable, in such cases, the closed-loop transmit power control is continued. By this means, the frequent occurrence of the control in deviation from the closed-loop transmit power control such as described above with reference to FIG. 5 can be avoided. Thus, the closed-loop transmit power control can be performed stably.

On the other hand, when the synchronization of the received signal is out, the transmit power determining circuit 413 switches from the closed-loop transmit power control by the transmit power control circuit 201 to the transmit power value control based on a past transmit power value by the transmit power select circuit 203 as long as the reliability of the received signal (demodulated signal) has been consecutively low. Thus, when having fallen into a state where the closed-loop transmit power control has difficulty in following, the transmit power control described above with reference to FIG. 5 is performed in deviation from the closed-loop transmit power control. In this case, the transmit power determining circuit 413 switches to the transmit power control based on a past transmit power value only when the reliability of the demodulated signal has been consecutively low, and thus the transmit power determining circuit 413 does not follow instantaneous variations of the received signal that it would follow if the closed-loop transmit power control were being used.

In this manner, the transmit power determining circuit 413 continues communication as far as possible, and immediately after detecting that the communication is out, switches from the closed-loop transmit power control to the transmit power control based on a past transmit power value. Thus, the transmit power value varies stably without following rapid changes of the received signal. Because the transmit power value varies stably in this way, the possibility that the current transmit power value has become a value that the closed-loop transmit power control can follow is high when the communication connection is resumed after being in the communication-out state. Hence, stable return to the closed-loop transmit power control is possible in resuming the communication.

Note that when the synchronization is still out after the process in step ST306, the transmit power select circuit 203 is configured to maintain the transmit power value controlled in step ST306, and after that, when the synchronization is restored, the transmit power value output from the transmit power control circuit 201 is selected.

As described above, according to the communication apparatus 400, when the synchronization of the received signal is established, the transmit power control is performed using a transmit power value obtained by the closed-loop transmit power control by the transmit power control circuit 201, and when the synchronization of the received signal is out, rapid changes of the transmit power value in controlling can be avoided by controlling the transmit power value to gradually return over a predetermined period to a transmit power value determined at a timing closest to the current timing from among the past reliable transmit power values determined when the synchronization was established, as long as the reliability of the received signal (modulated signal) has been consecutively low. Thus, even after the transmit power control based on a past transmit power value by the transmit power select circuit 203 has been performed in deviation from the processing loop (of the closed-loop transmit power control) by the transmit power control circuit 201, the transmit power control by the transmit power control circuit 201 can be made to function smoothly. Therefore, the transmit and receive quality of the CDMA scheme can be secured.

While the above embodiment describes the case where the transmit power select circuit 203 makes the transmit power value converge to a target transmit power value by steps over the steps of one frame (15 slots) when the synchronization is out, the present invention is not limited to this. The point is to make the transmit power value gradually converge to a target value. For example, the transmit power value may be made to converge to a target transmit power value by steps over the steps of a half frame. The number of steps over which to make the transmit power value converge to a target value can thus take various numbers.

Moreover, the above embodiment has described the case where the circuit sections of the transmit power determining circuit 413 perform the processing described above with reference to FIG. 11, but the present invention is not limited to this. A computer may be configured to execute the processing procedure. In this case, it is required only that, having the processing procedure described above with reference to FIG. 11 stored as a program in a recording medium such as an optical disk, the computer be made to execute the program read out from the recording medium.

Furthermore, the above embodiment has described the case of applying the present invention to a mobile station apparatus, but the present invention is not limited to this. Applying the present invention to a base station apparatus can also achieve the same effect as above.

The present description is based on Japanese Patent Application No.2002-114841 filed on Apr. 17, 2002, which is incorporated herein by reference.

INDUSTRIAL APPLICABILITY

The present invention can be applied to a communication apparatus used in a mobile communications system using the CDMA (Code Division Multiple Access) scheme and a transmit power control method for the communication apparatus.

What is claimed is:

1. A transmit power control method for a communication apparatus, the method comprising:
   a transmit power control step of receiving a transmit signal transmitted from a mobile station or base station per slot and controlling a transmit power value of a signal to transmit to the mobile station or base station based on the received signal;
   a transmit power value storing step of storing a predetermined number of past transmit power values for use in the transmit power control step;
   a synchronization determining step of detecting a synchronous state of the received signal per frame comprised of N slots; and
   a transmit power selection step of determining whether or not to select the transmit power value controlled in the transmit power control step based at least on the synchronous state, and, in a frame where the transmit power value controlled in the transmit power control step is not selected, changing the transmit power value from a transmit power value immediately before to a transmit power value N slots before, gradually over a predetermined plural number of steps.

2. The transmit power control method for a communication apparatus according to claim 1, wherein in a frame where the out-of-sync state is detected, the transmit power selection step does not select the transmit power value controlled in the transmit power control step.

3. The transmit power control method for a communication apparatus according to claim 1, further comprising:
   a reliability determining step of determining reliability of the received signal, wherein
   in a frame where the out-of-sync state is detected and where a decrease in reliability is detected, the transmit power selection step does not select the transmit power value controlled in the transmit power control step.

4. The transmit power control method for a communication apparatus according to claim 1, further comprising:
   a reliability determining step of determining reliability of the received signal, wherein
   in a frame where the out-of-sync state is detected and a decrease in reliability is detected a predetermined number of times consecutively, the transmit power selection step does not select the transmit power value controlled in the transmit power control step.

* * * * *